(12) United States Patent
Tan et al.

(10) Patent No.: US 9,407,978 B2
(45) Date of Patent: Aug. 2, 2016

(54) COMBINED SPEAKER GRILL AND PUSH-TO-TALK AUDIO ACCESSORY

(71) Applicant: MOTOROLA SOLUTIONS, INC, Schaumburg, IL (US)

(72) Inventors: YiChun Tan, Penang (MY); Kah Kin Fong, Penang (MY); Beng Gian Ooi, Penang (MY); Imadi Safwan Samsudin, Penang (MY); Guohonn Wong, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 64 days.

(21) Appl. No.: 14/553,507

(22) Filed: Nov. 25, 2014

(65) Prior Publication Data

US 2016/0150303 A1    May 26, 2016

(51) Int. Cl.
*H04R 1/02* (2006.01)
*H04W 4/10* (2009.01)

(52) U.S. Cl.
CPC . *H04R 1/02* (2013.01); *H04W 4/10* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 3,370,236 A * | 2/1968 | Walker | | H04B 1/385 224/674 |
| 4,491,699 A * | 1/1985 | Walker | | H04M 1/05 128/201.19 |
| 5,434,582 A | 7/1995 | Koike et al. | | |
| 5,802,197 A | 9/1998 | Fulcher | | |
| 6,179,666 B1 | 1/2001 | Osborn | | |
| 6,321,428 B1 * | 11/2001 | Toda | | B06B 1/0688 29/25.35 |
| 6,933,927 B2 | 8/2005 | Lu | | |
| 7,043,042 B2 | 5/2006 | Huang et al. | | |
| 7,349,551 B2 | 3/2008 | Skillicorn et al. | | |
| 7,840,021 B2 | 11/2010 | Greco et al. | | |
| 8,509,693 B2 | 8/2013 | Pinder et al. | | |
| 2006/0050917 A1 | 3/2006 | Skillicorn et al. | | |
| 2007/0105601 A1 | 5/2007 | Ibbetson et al. | | |
| 2007/0248223 A1 | 10/2007 | Liou | | |
| 2009/0180662 A1 * | 7/2009 | Parker | | H04R 27/00 381/394 |
| 2013/0287213 A1 | 10/2013 | Sekiyama | | |

FOREIGN PATENT DOCUMENTS

JP    2012093672 A  *  5/2012
WO   2012056861 A1    5/2012

OTHER PUBLICATIONS

The International Search Report and the Written Opinion, PCT/US2015/060869, filed: Nov. 16, 2015, mailed Feb. 9, 2016, all pages.

* cited by examiner

*Primary Examiner* — Brenda Bernardi
(74) *Attorney, Agent, or Firm* — Barbara R. Doutre (57) ABSTRACT

A portable communication device, such as a remote speaker microphone (RSM) (100) is provided with a movable paddle (104) providing a combination speaker grill and push-to-talk actuator. The RSM incorporates drainage paths (110) to prevent moisture from collecting around the movable paddle (104). An internal speaker (502) is retained within the RSM (100) in a stationary manner with sufficient front and back volumes impervious to the actuations of the movable paddle (104). The movable paddle (104) provides improved tactile feedback over a large surface.

21 Claims, 9 Drawing Sheets

COMBINED SPEAKER GRILL AND PUSH-TO-TALK AUDIO ACCESSORY

FIELD OF THE DISCLOSURE

The present disclosure relates generally to an audio accessory for a portable communication device, and more particularly to a remote speaker microphone (RSM).

BACKGROUND

Communication devices, such as portable radios, often operate in conjunction with a variety of audio accessory devices. Such audio accessories are often required to be designed within very limited space constraints. A remote speaker microphone (RSM) is an audio accessory which is typically used in conjunction with a portable radio operating in a public safety environment, such as law enforcement and fire rescue environments. The RSM device is typically worn at the shoulder, such as clipped to an epaulette or lapel. Remote speaker microphones typically include a speaker, a microphone, a push-to-talk (PTT) button and electronic circuitry. The speaker element of an RSM, in particular, tends to be large relative to the amount of space available. For example an electromagnetic loudspeaker requires space for adequate front and back volumes. Additionally, RSMs are often operated in environments requiring gloved usage and as such, the PTT button needs to provide good tactile feedback. The ability to improve tactile feedback without taking up additional space is highly desirable. Harsh environmental usage further necessitates that these devices be resistant to water and debris.

Accordingly, there is a need for an improved audio accessory that addresses the aforementioned issues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments an audio accessory comprising a remote speaker microphone (RSM) is provided with a movable paddle providing a combination speaker grill and push-to-talk actuator. In accordance with the various embodiments, the internal speaker is retained within the RSM in a stationary manner with sufficient front and back volumes. The RSM incorporates audio porting and a drainage path for moisture drainage. The paddle is movable and provides improved tactile feedback particularly well suited for gloved PTT actuation.

Figure 1:
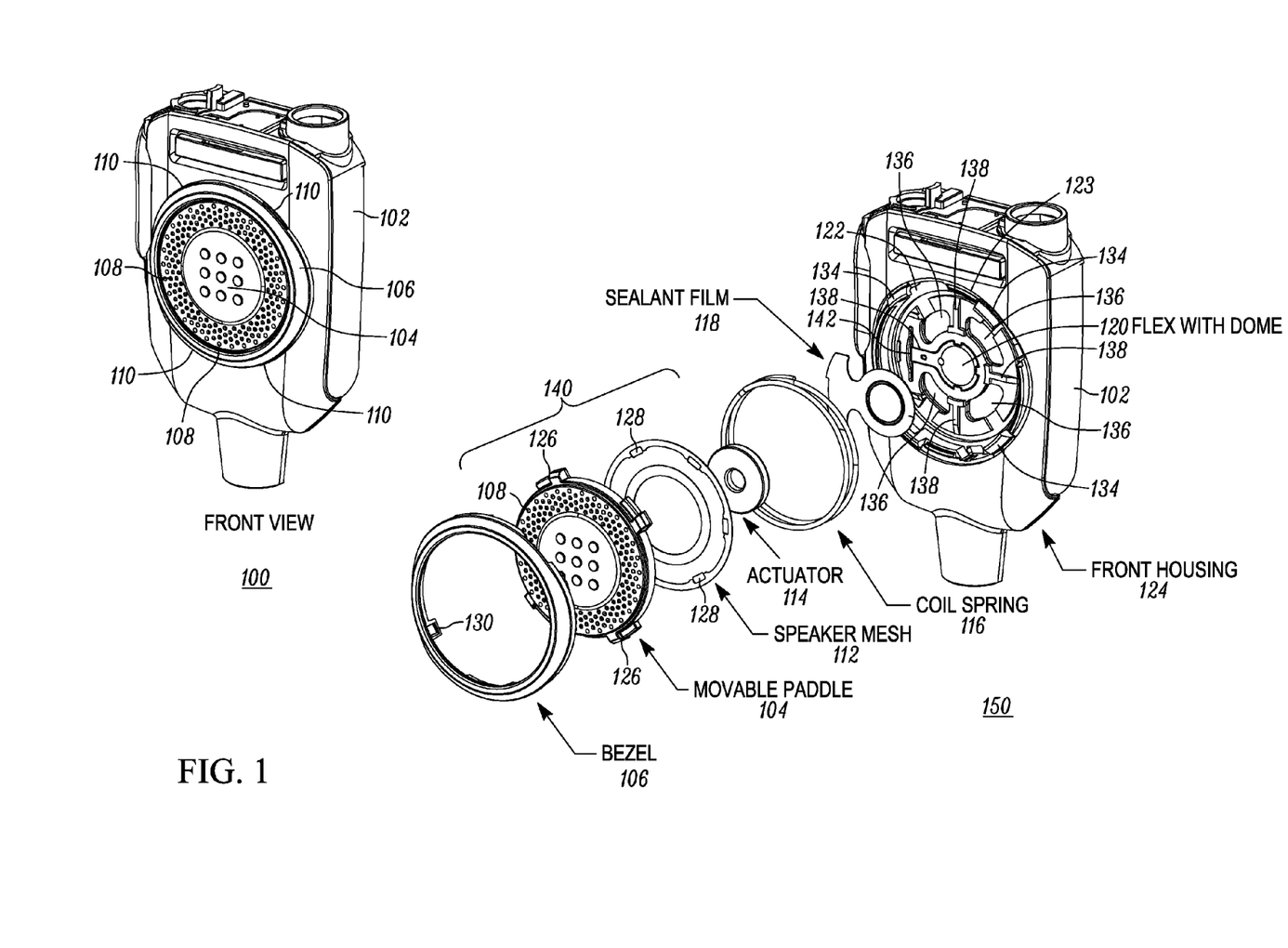
FIG. 1 is a remote speaker microphone and associated exploded view in accordance with the various embodiments.

FIG. 1 is a remote speaker microphone (RSM) 100 and associated exploded view 150 in accordance with the various embodiments. Remote speaker microphone 100 comprises a housing 102 having a movable paddle 104 situated within a bezel 106 located on the front of the housing. The RSM's movable paddle 104 provides combined push-to-talk (PTT) actuator and speaker porting 108. The movable paddle 104 is movable inward and outward within the bezel 106 providing improved tactile feedback for the user during PTT actuation. The movable paddle 104 comprising audio porting 108 enables the movable paddle to function as a speaker grill for the audio accessory. The RSM 100 further comprises drainage paths 110 to provide a bypass for moisture and to further allow the RSM 100 to operate under wet conditions. The various assemblies and sub-assemblies to be described herein provide for a combination of speaker grill, PTT and drainage well suited for harsh environments and gloved usage.

In accordance with the various embodiments, the housing 102 comprises first and second compartments separated by a support section 138, the first compartment for containing the components shown in exploded view 150 of FIG. 1, and the second compartment for containing a speaker and its associated components shown later in conjunction with FIG. 5. As seen in FIG. 1 at exploded view 150, the RSM assembly comprises bezel 106, movable paddle 104 having audio porting 108, a speaker mesh 112, an actuator 114, a coil spring 116, and a sealant film 118 to be assembled within an aperture 122 of front housing 124 of housing 102. The actuator 114 is a non-conductive element which can be made of rubber or other non-conductive material. Within the housing aperture 122 is coupled a flex 120 containing a metal dome, which will be covered by the sealant film 118 and to which the actuator 114 will align. The sealant film 118 may be formed of a polyester type material such as Mylar or other similar material. The flex 120 further comprises conductive traces operating as a flexible PCB to connect, through elongated slot 142, to a fixed PCB which is located in the second compartment to be described later. Flex 120 is placed in the center of the support section 138, shown as having four ribs which may be held in place by tabs or other retention means (not shown). The sealant film 118 will seal the flex 120 and close the elongated slot 142 of the support section 138.

The configuration of the support section 138 formed of four plastic ribs allows for four large speaker ports 136 behind which will be mounted the stationary speaker, shown in other views. Thus, the housing 102 provides two compartments for the overall assembly, one compartment in front of the support section 138 and another behind the support section. While the support section 138 may be formed or shaped differently (e.g. additional ribs, fewer ribs) the design should take into account structural support needed for the compressible coil spring 116 and flex 120, in conjunction with sufficient audio porting 136 for the speaker.

Briefly, describing the assembly of RSM 100, the sealant film 118 and flex 120 are placed against the center of the support section 138, and the flex 120 is inserted into the elongated slot 142 of the support section 138 to connect to electronics (not shown) elsewhere within the RSM 100. The coil spring 116 is then inserted into the aperture 122. A paddle sub-assembly 140 comprising movable paddle 104, speaker mesh 112, and actuator 114 is then inserted into the aperture 122 upon the coil spring 116. The paddle sub-assembly 140 is coupled together prior to mounting into the housing 102, as will be described later. The bezel 106 is then coupled to the housing 102. The housing 102 and bezel 106 when coupled together provide the drainage paths 110. The various interconnect mechanisms are discussed next.

Looking at the exploded view 150 in more detail, the movable paddle 104 comprises paddle tabs 126 along its perimeter as part of a retention mechanism toward front housing 102. The speaker mesh 112 having corresponding mesh slots 128 will be place underneath the moveable paddle 104. The RSM housing 102 comprises housing hooks 134 located around aperture 122. The housing hooks 134 are molded as part of the housing and are used to retain the movable paddle 104 in place within aperture 122 by rotating the paddle in a counterclockwise direction such that the paddle tabs 126 are captured by housing hooks 134.

Once the paddle is rotated into place, the bezel is then coupled to the housing 102 with bezel tabs 130 locking the paddle tabs 126 within housing hooks 134. The bezel tabs 130 are then welded with the housing 102 based on ultrasonic energy directors (not shown but known in the art of ultrasonic welding) located around the front housing aperture 122. While this locking mechanism secures the movable paddle 104 from further rotation (clockwise or counterclockwise), the paddle is still able to move inward and outward based on the coil spring 116 and vertical tolerance spacing between the housing hooks 134 and paddle tabs 126.

In accordance with the various embodiments, the RSM assembly allows the movable paddle 104 to be actuated for inward and outward movement over a large area while the speaker remains stationary. Pressing the movable paddle 104 causes the internal coil spring 116 to compress allowing the actuator 114 to make contact with the dome located in flex 120 and allowing for transmission of audio. The support section 138 of the RSM assembly advantageously allows actuation of movable paddle 104 without causing movement of the speaker. The completed assembly further beneficially provides for drainage paths 110 allowing the RSM 100 to operate even when wet.

Figure 2:
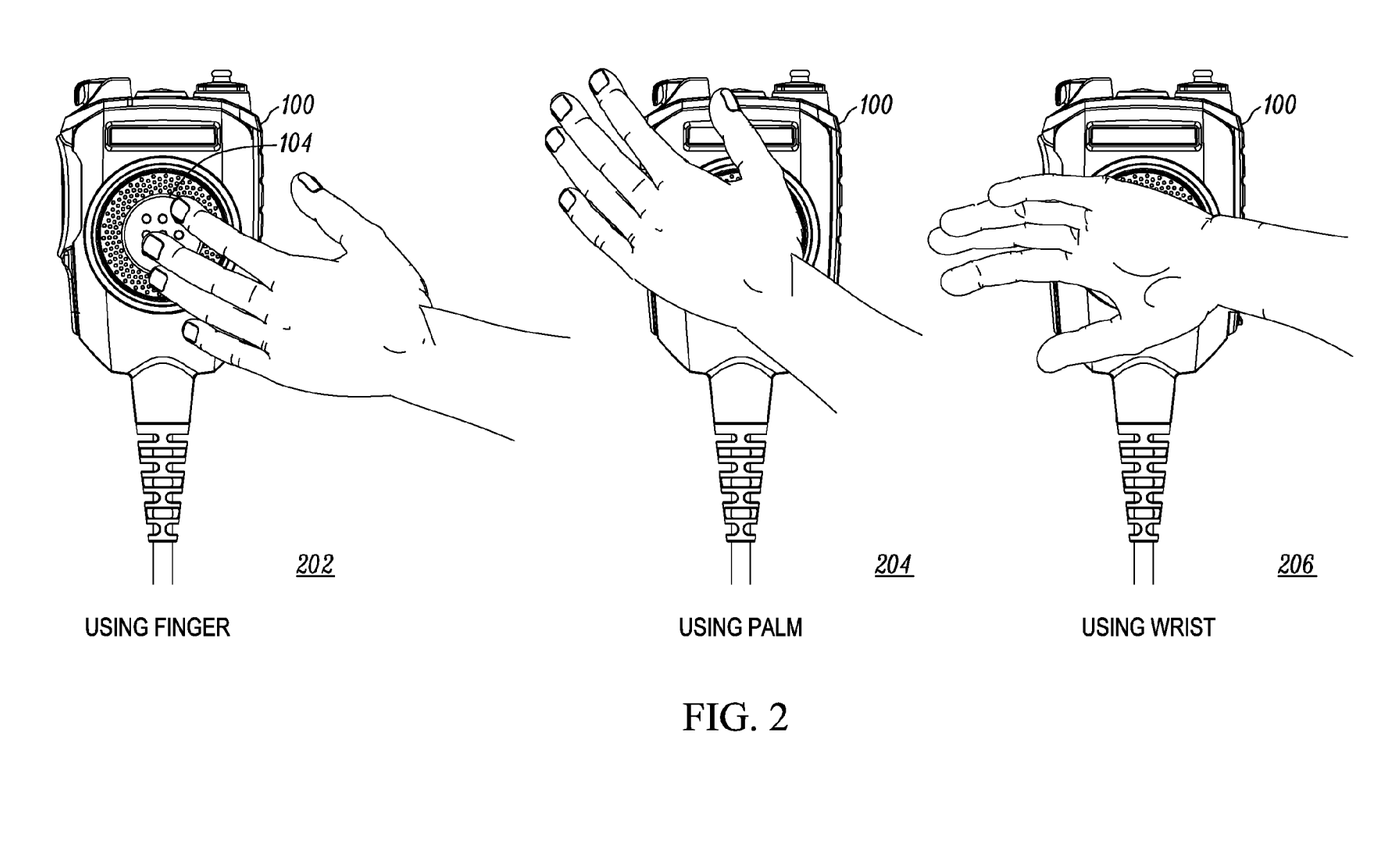
FIG. 2 shows usage views of the RSM of FIG. 1 in accordance with the various embodiments.

FIG. 2 shows usage views of the RSM 100 in accordance with the various embodiments. The PTT paddle is sufficiently large to accommodate finger actuation 202, palm actuation 204 and wrist actuation 206. The movable paddle 104 is capable of being actuated anywhere on its' surface for PTT paddle functionality. The larger actuation area facilitates gloved usage of the PTT feature in harsh environments, providing strong tactile feedback. Thus, an improved user interface is provided by the RSM 100.

Figure 3:
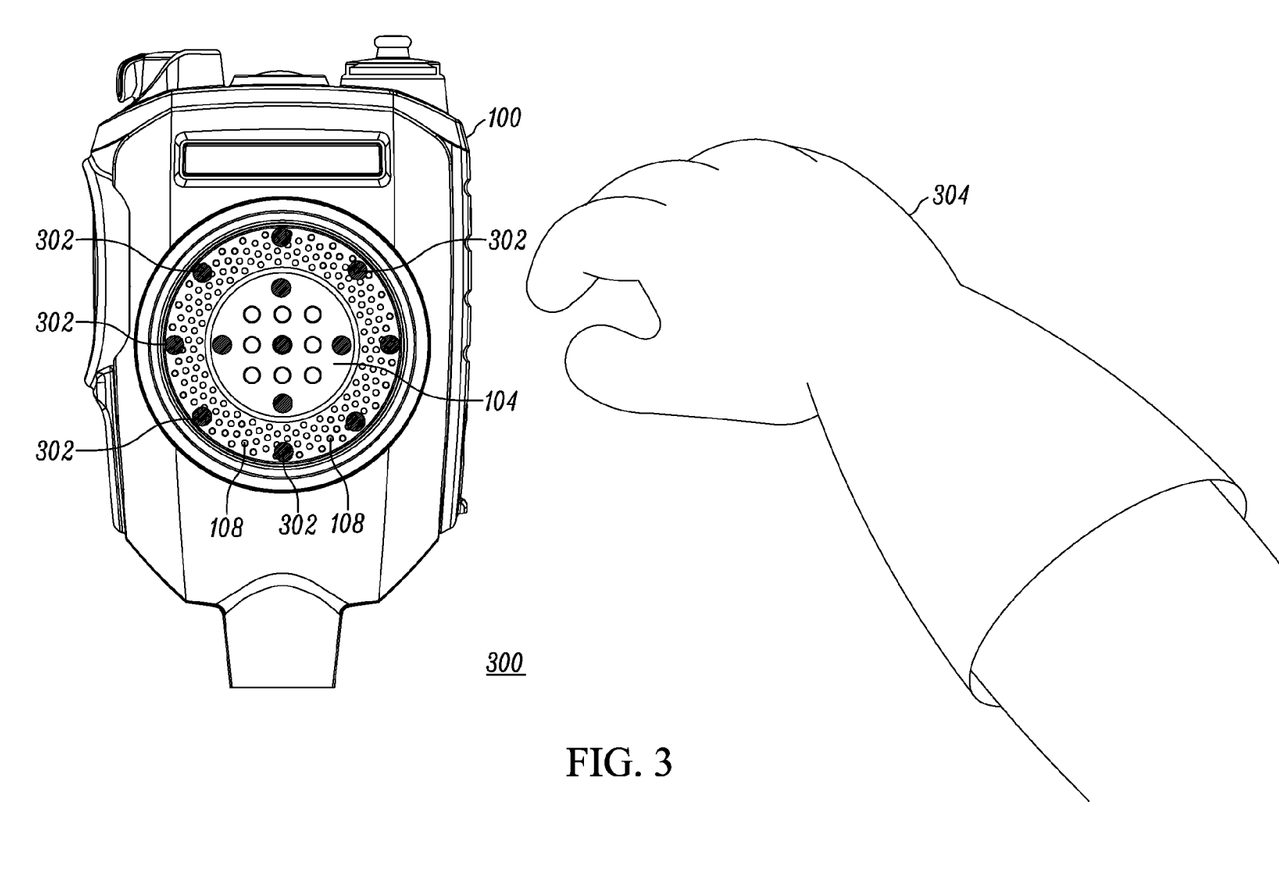
FIG. 3 further shows the RSM with PTT paddle indicating a plurality of actuation points in accordance with the various embodiments.

FIG. 3 shows the RSM 100 with movable paddle 104 indicating a plurality of actuation points 302, all of which provide a high actuation force and good tactile feedback. The action points 302 are not intended to be limiting, these points are simply illustrated to emphasize that the movable paddle 104 can be actuated anywhere on its' surface for PTT operation. Both center and off-center actuation points 302 are capable of actuating the movable paddle 104. Thus, the actuations shown in FIG. 2 (finger actuation 202, palm actuation 204 or wrist actuation 206) are not required to be at the center of the movable paddle 104 for PTT actuation.

Again, the ability to actuate the movable paddle 104 for PTT operation through a variety of user input actuations at a plurality of different actuations points is highly beneficial to users working in public safety type environments. The large movable paddle capable of being actuated anywhere on its surface provides improved tactile feedback particularly well suited for gloved PTT actuation 304. Public safety personnel often wear heavy gloves when working in harsh environments subjected to water, cold temperatures, dust and debris.

Figure 4:
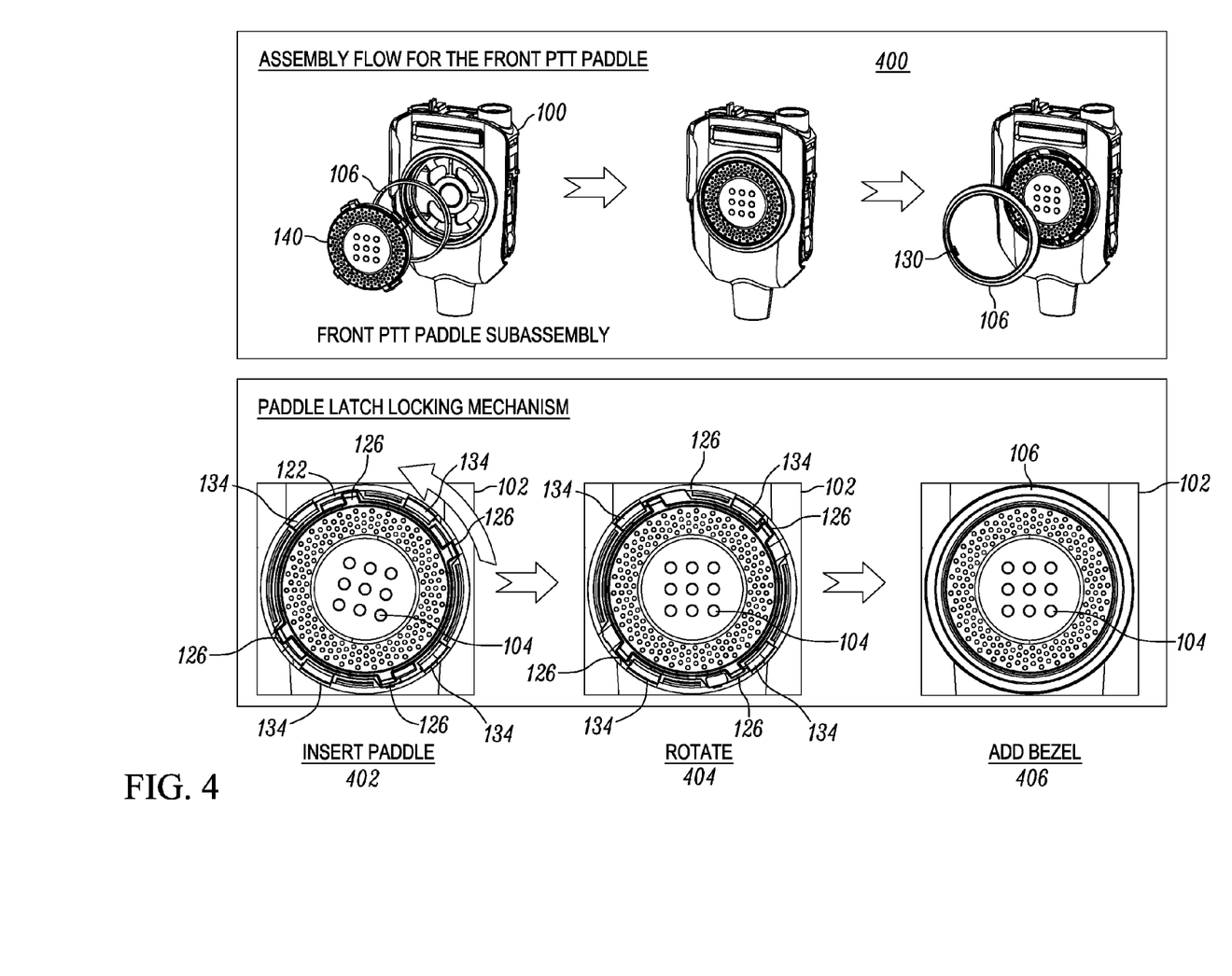
FIG. 4 shows an assembly flow for the front PTT paddle of the RSM as well as paddle latch locking mechanism in accordance with the various embodiments.

FIG. 4 shows an assembly flow for the front PTT paddle at view 400 as well as paddle latch locking mechanism at views 402, 404, 406 in accordance with the various embodiments. For these embodiments, the paddle sub-assembly 140 is already assembled and the housing 102 already has the sealant film 118 with flex 120 seated within the support section 138 of aperture 122.

View 400 shows the assembly flow for the paddle sub-assembly 140 into the front of the housing 102. The coil spring 116 is first inserted within the front housing aperture 122. The paddle sub-assembly 140 is then seated upon the coil spring 116 and rotated into place as described by subsequent views 402 and 404. Next, the bezel 106 is coupled to housing 102 via bezel tabs 130.

Referring to view 402 of the paddle latch locking mechanism, the paddle sub-assembly 140 is shown seated within aperture 122 of housing 102. The paddle sub-assembly 140 is pressed in (upon the coil spring 116) and turned counterclockwise such that the paddle tabs 126 slide and engage into housing hooks 134. The bezel 106 is then coupled to the housing 102 using the bezel tabs 130 and then ultrasonically welded to prevent the movable paddle 104 from rotating when pressed.

Figure 5:
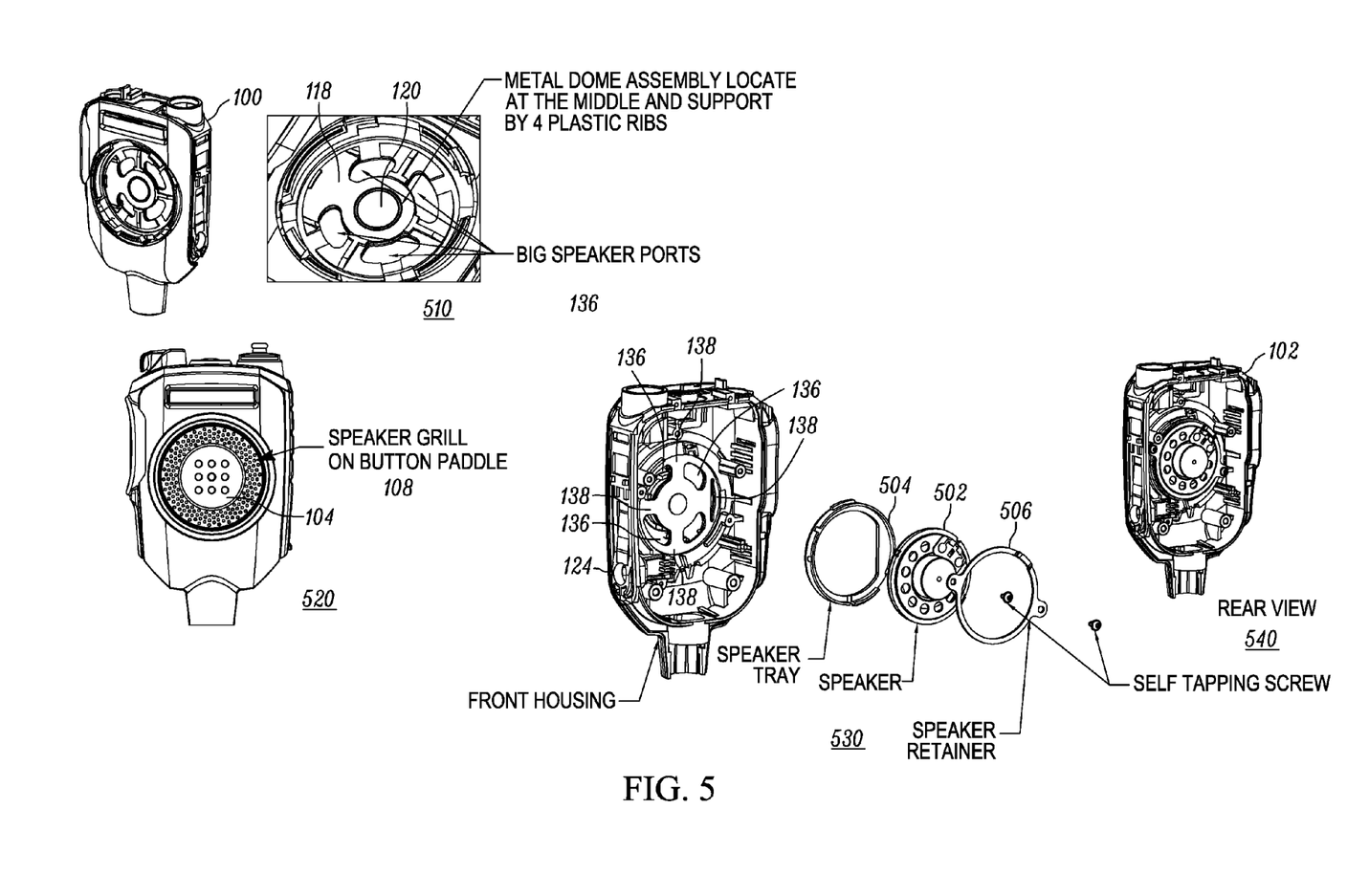
FIG. 5 shows additional views of assembly for the RSM in accordance with the various embodiments.

FIG. 5 shows additional views of assembly for the RSM 100 in accordance with the various embodiments. In partial view 510, the flex 120 is covered by sealant film 118 and are shown seated upon the support section 138 at the center of the four plastic ribs which further form the four large speaker ports 136. The sealant film 118 acts as a sealant over the flex 120. View 520 shows an assembled front view of the RSM 100 with the movable paddle 104 having speaker grill 108. View 530 is a back exploded view showing the support section's ribs 138, speaker ports 136 and a speaker assembly comprising a speaker tray 504, a speaker 502, and a speaker retainer 506. The speaker 502 sits within speaker tray 504 which is then mounted in a stationary manner behind the speaker ports 136 using speaker retainer 506. The retention of the speaker 502 can be accomplished using known retaining techniques, such as self-tapping screws, clips, tabs or other retention means. The large porting 136 in combination with speaker grill 108 provides suitable porting for the speaker 502.

View 540 shows an open rear view of the RSM 100 with the speaker attached in a stationary manner within the housing 102. Retaining the speaker in a stationary manner ensures proper front and back volumes for audio. The location of the stationary speaker 502 behind the ribs of the support section 138 is particularly advantageous in protecting it against punctures and tears in addition to the protection provided by speaker mesh 112 on the front side of the assembly. Referring back to partial view 510, the dome in flex 120, even when actuated by a PTT paddle press on the front of RSM 100, does not move the speaker 502. The speaker 502 thus remains stationary even when the PTT is pressed. The housing 102 having two compartments separated by the support section 138 allows for the large movable paddle 104 with strong tactile feedback to be used in one compartment for PTT actuation, while protecting the speaker and maintaining good audio characteristics in the other compartment. The speaker is thus impervious to PTT actuation.

Figure 6:
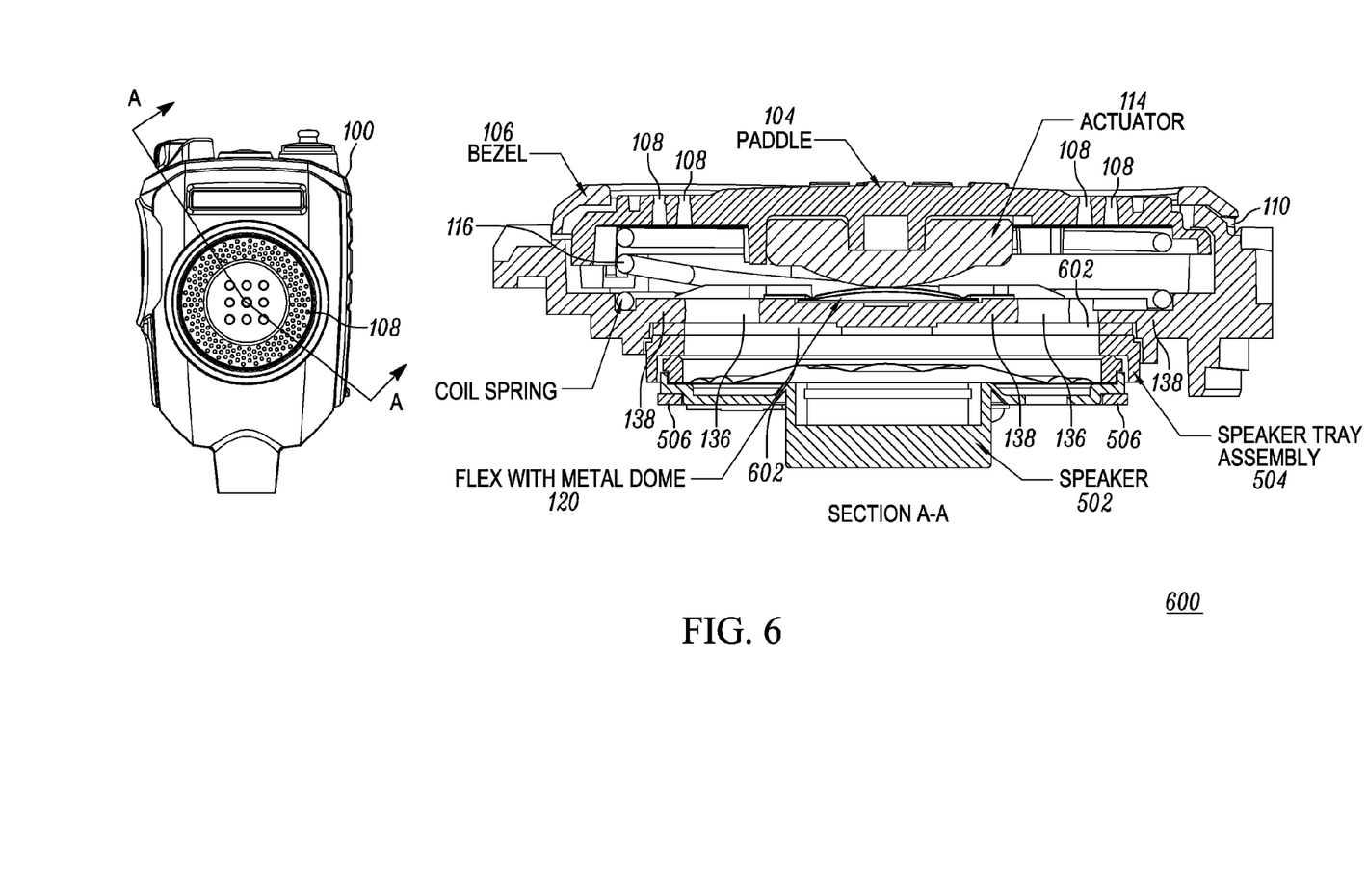
FIG. 6 is a cross sectional view of the RSM assembly formed in accordance with the various embodiments.

FIG. 6 is a cross sectional view of an assembly 600 for RSM 100 formed in accordance with the various embodiments. RSM assembly 600 comprises housing 102, bezel 106, movable paddle 104 (between which are formed drainage paths 110), actuator 114, coil spring 116, flex 120, speaker porting 136, support section 138, speaker tray 504, speaker 502, and speaker retainer 506. Assembly 600 advantageously retains the speaker 502 in a stationary manner behind the support section 138 making the speaker impermeable to PTT presses. The drainage paths 110 of assembly 600 further prevent moisture from getting inside the housing as will be described in greater detail in subsequent views. In accordance with the various embodiments, drainage paths 110 are formed between the bezel 106 and the housing 102 and also between the housing 102 and the paddle 104. These will be described in more detail in conjunction with FIG. 8.

Additionally, a thin film 602, such as polyether polyurethane or the like, can be used to seal the speaker ports 136 between the two separate compartments, wherein the enclosure beneath the movable paddle 104 provides the speaker front volume and the housing enclosure behind the speaker provides the speaker's back volume. This thin film 602 does not block the audio and is highly advantageous in audio systems for water sealing and acoustic performance.

The RSM assembly 600 is able to achieve a rating of Ingress Protection of IP67 and maintain permissible surface temperatures of the speaker for ATEX (ATmosphere EXplosibles) type environments. The Ingress Protection certification system is administered by the International Electrotechnical Commission and can be broken down as follows: IP stands for Ingress Protection; the first digit is on a scale do 0 to 6 and represents the level of dust protection the device offers (higher numbers are better); and the second digit is on a scale of 0 to 9 and represents the level of water protection the device offers (higher numbers are better).

Figure 7:
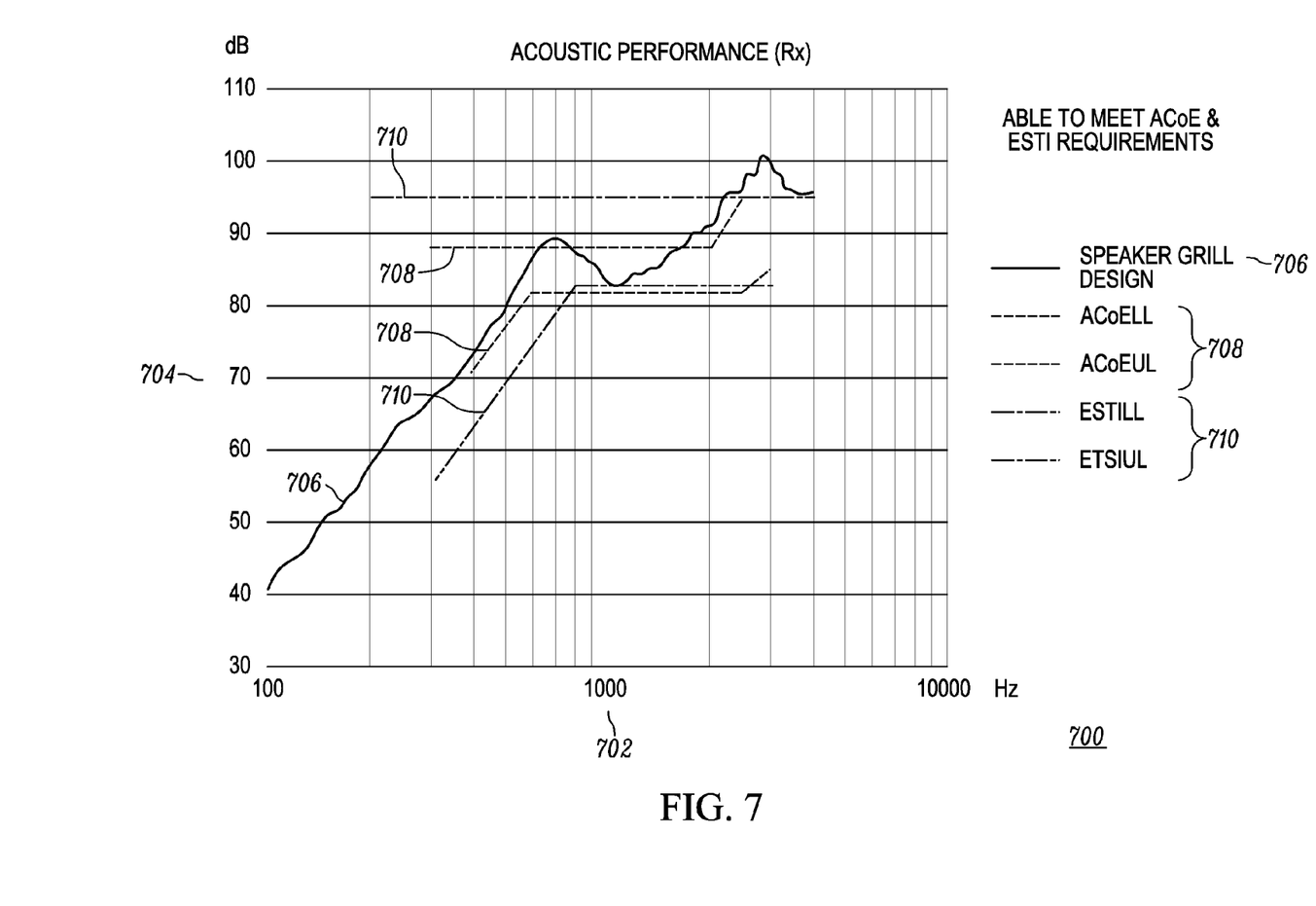
FIG. 7 is a graph illustrating an example of acoustical performance obtained with an RSM formed in accordance with the various embodiments.

FIG. 7 is a graph 700 illustrating an example of acoustical performance obtained with an RSM formed in accordance with the various embodiments. Frequency (Hz) 702 is shown along the horizontal axis, and sound pressure level (decibels) 704 is shown along the vertical axis. The data 706 shows that a speaker assembled in accordance with the various embodiments was able to meet both American Army Corps of Engineers (ACoE) standards 708 and European Telecommunications Standards Institute (ETSI) standards 710.

Figure 8:
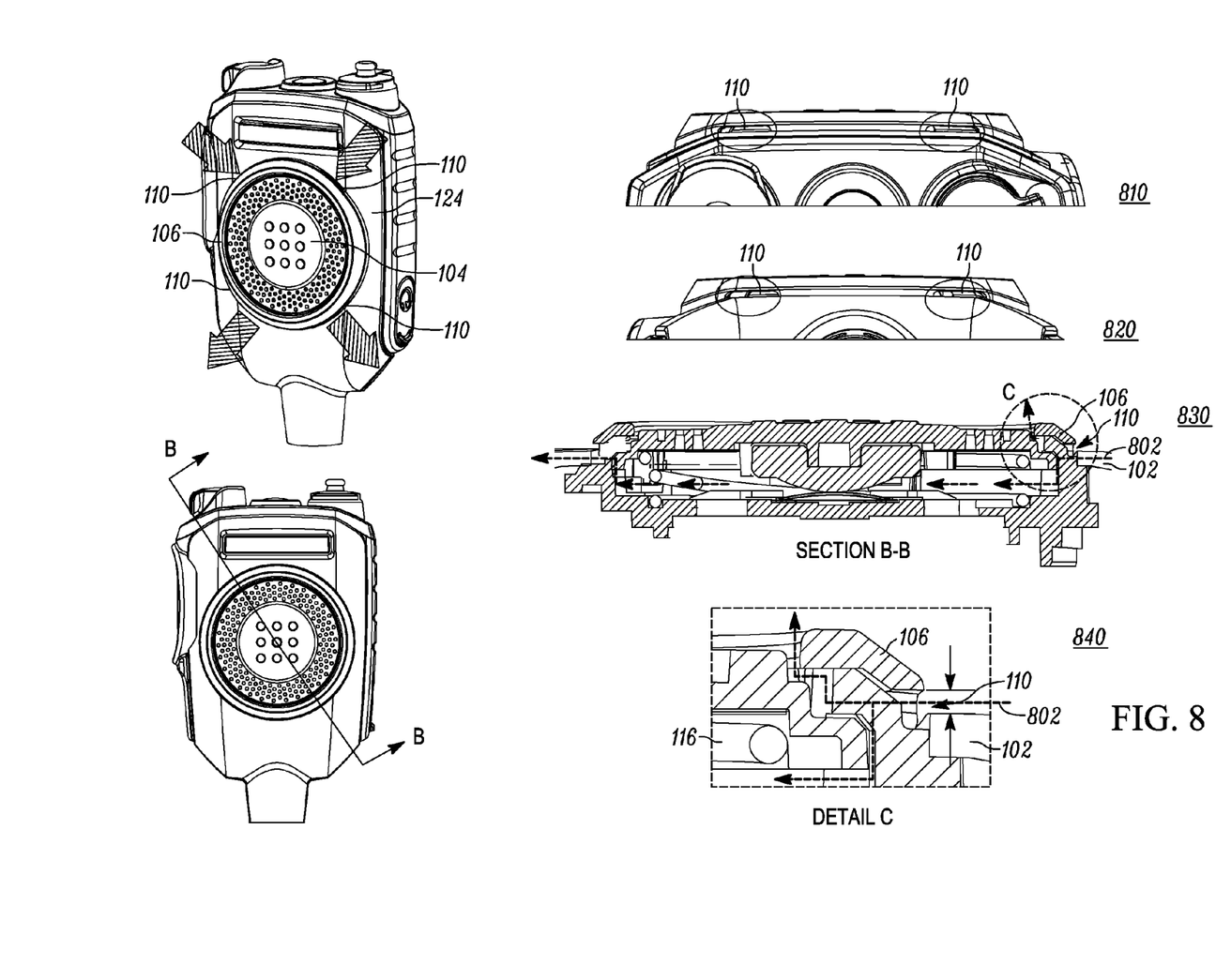
FIG. 8 shows details pertaining to the drainage paths for the RSM formed in accordance with the various embodiments.

FIG. 8 shows details pertaining to the drainage paths 110 for the RSM 100 formed in accordance with the various embodiments. Two drainage paths 110 are located on the front of housing 102 with the entry of each path being at the top 810 of the bezel 106, and the exit of each drainage path 110 being at the bottom 820 of the bezel.

Cross sectional view 830 and detailed view 840 show more detail of a drainage path 110. Each drainage path 110 is formed by a small opening between the bezel 106 and the housing 102. The drainage paths 110 allow moisture to enter and exit easily from the housing 102 without accumulating around the movable paddle 104 when it is flushed out by air or water. This approach advantageously prevents the movable paddle 104 from becoming stuck frozen, which allows for PTT actuation. In accordance with the various embodiments, from the opening at 110, water 802 may flow along two paths. Opening 110 leads into a drainage path formed between the bezel 106 and the housing 102, and the same opening 110 allows drainage between the housing 102 and the paddle 106. Thus, water advantageously does not collect around the paddle or come into contact with the speaker.

Figure 9:
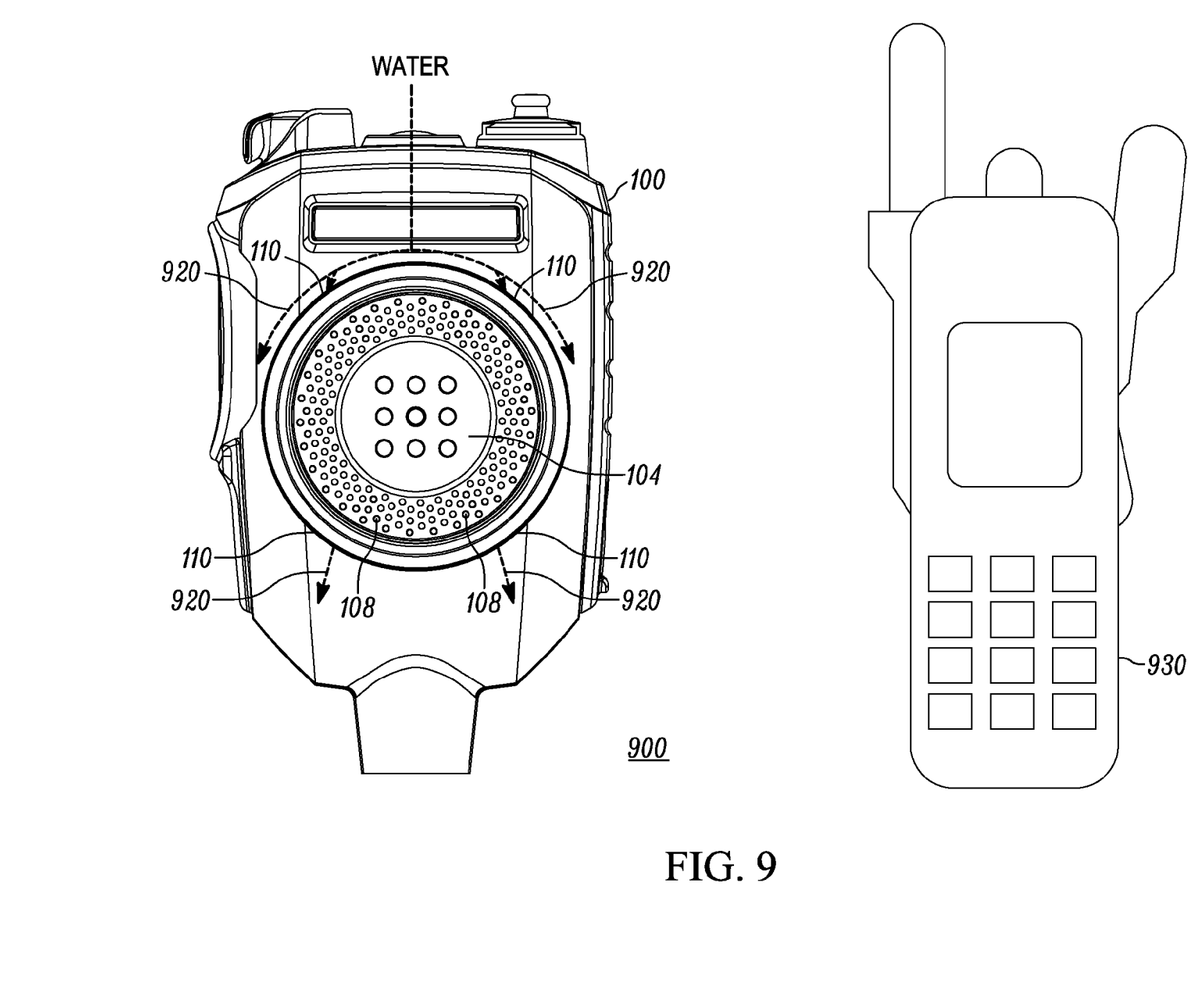
FIG. 9 illustrates an example of moisture entering and exiting drainage paths provided by an RSM formed in accordance with the various embodiments.

FIG. 9 illustrates an example of the RSM 100 draining moisture 920 through drainage paths 110 in accordance with the various embodiments. Moisture that enters the opening of drainage paths 110 at the top of the bezel exits at drainage paths 110 at the bottom of the bezel. The incorporation of the drainage paths 110 between the bezel 106 and housing 102 prevents moisture from collecting and freezing within the housing 102, thereby allowing the PTT paddle to be actuated even in cold and wet environments.

The RSM 100 may operate as part of a portable communication system 900 which comprises a portable radio 930. The RSM 100 is communicatively coupled, via a wired or wireless interconnect, to portable radio 930. Portable communication system 900 may operate with the radio 930 being worn at a user's belt or strapped to the user's side, with the RSM being worn at the user's shoulder at a lapel, epaulette, or strap via a clip or other know attachment means.

Accordingly, the various embodiments have described an audio accessory providing for an improved user interface. The combined speaker grill, push-to-talk actuator, and drainage paths take up little space while providing an easily accessible, large PTT. While the embodiments are particularly well suited to the remote speaker microphone (RSM), it is contemplated that other portable communication devices which utilize push-to-talk and speaker operations may also benefit from the improved user interface, such as portable two-way radio. The large movable paddle 104 can be actuated anywhere on the surface of the paddle which is particularly advantageous for PTT operation in harsh environments and/ or gloved usage. The speaker being retained in a stationary manner in its own enclosure is well protected and provides good acoustical performance. The drainage paths provide improved environmental resistance to harsh environments, preventing freezing of the PTT and allowing the device to operate even under wet conditions. Users operating such devices in public safety type environments or other harsh environments can greatly benefit from the improved features provided by the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
    a housing having an aperture formed therein and housing hooks located around the aperture;
    a support section formed within the aperture, the support section having speaker porting formed therein, the support section dividing the housing into first and second compartments;
    a coil spring seated within the aperture on the support section in the first compartment of the housing;
    a movable paddle seated on the coil spring, the movable paddle being rotatably coupled to the housing hooks, the movable paddle providing a combined speaker grill and push-to-talk (PTT) actuator;
    a bezel coupled to the housing, the bezel having bezel tabs preventing rotation of the movable paddle;
    a drainage path formed between the bezel and the housing;
    a drainage path formed between the housing and the paddle; and
    a speaker coupled in a stationary manner in the second compartment of the housing behind the support section having the speaker porting and aligned with the speaker grill.

2. The portable communication device of claim 1, wherein the drainage paths prevent moisture accumulation.

3. The portable communication device of claim 1, wherein the RSM operates under wet conditions.

4. The portable communication device of claim 1, wherein the movable paddle is sufficiently large to accommodate PTT actuation by finger, palm and wrist actuations.

5. The portable communication device of claim 1, wherein the movable paddle comprises paddle tabs, the paddle tabs being rotatably coupled to the housing hooks.

6. The portable communication device of claim 1, wherein the movable paddle is actuated anywhere on its surface for PTT operation.

7. The portable communication device of claim 1, wherein the movable paddle is actuatable with gloved usage for PTT operation.

8. The portable communication device of claim 1, wherein the bezel is ultrasonically welded to the housing.

9. The portable communication device of claim 1, further comprising:
    an actuator coupled to the movable paddle;
    a flex with dome seated within the support section; and
    the actuator making contact with the dome in response to the movable paddle being actuated.

10. The portable communication device of claim 1, wherein the support section having speaker porting protects the speaker from actuation of the movable paddle while providing audio porting for the speaker.

11. The portable communication device of claim 1, wherein the portable communication device is one of: a remote speaker microphone or a portable radio.

12. A remote speaker microphone (RSM), comprising:
    a housing having a front surface;
    a movable paddle coupled to the front surface, the movable paddle providing a combination of a speaker grill and a push-to-talk actuator;
    a bezel coupled to the housing, the bezel preventing the movable paddle from being rotated, the bezel and housing forming at least one drainage path therebetween; and
    a speaker coupled in a stationary manner within the housing aligned with the speaker grill.

13. The remote speaker microphone (RSM) of claim 12, further comprising:
    a coil spring upon which the movable paddle moves upward and downwards in response to being actuated.

14. The remote speaker microphone (RSM) of claim 12, further comprising:
    a support section located within the housing, the support section forming first and second compartments, the support section having speaker porting formed therein; and
    the movable paddle being coupled within the first compartment, and the speaker being coupled in a stationary manner in the second compartment aligned with the speaker porting.

15. The remote speaker microphone (RSM) of claim 14, wherein the support section comprises a plurality of ribs forming speaker porting therebetween.

16. The remote speaker microphone (RSM) of claim 12, wherein the movable paddle is sufficiently large to accommodate PTT actuation by finger, palm and wrist actuations.

17. The remote speaker microphone (RSM) of claim 12, wherein the movable paddle is compressible anywhere on its surface.

18. A portable communication system, comprising:
   a portable radio; and
   a remote speaker microphone (RSM) communicatively coupled to the portable radio, the RSM comprising:
      a housing having an aperture with a support section formed therein, the support section having speaker porting;
      a speaker mounted in a stationary manner behind the support section having speaker porting;
      a coil spring located within the aperture on top of the support section;
      a movable paddle seated upon the coil spring; and
      a bezel coupled to the housing around the movable paddle, the bezel and housing forming at least one drainage path.

19. The portable communication system of claim 18, wherein the portable communication system is a public safety communication system.

20. The portable communication system of claim 18, wherein the movable paddle accommodates gloved usage.

21. The portable communication system of claim 18, further comprising:
   another drainage path formed between the housing and movable paddle.

* * * * *